(12) United States Patent
Portelli et al.

(10) Patent No.: US 11,084,010 B2
(45) Date of Patent: Aug. 10, 2021

(54) TEMPERATURE CONDITIONED TWO COMPONENT MIXER MANIFOLD

(71) Applicant: Saint Clair Systems, Romeo, MI (US)

(72) Inventors: Mark Portelli, Romeo, MI (US); Michael R. Bonner, Romeo, MI (US)

(73) Assignee: SAINT CLAIR SYSTEMS, INC., Romeo, MI (US)

( * ) Notice: Subject to any disclaimer, the term of this patent is extended or adjusted under 35 U.S.C. 154(b) by 339 days.

(21) Appl. No.: 16/146,297

(22) Filed: Sep. 28, 2018

(65) Prior Publication Data

US 2019/0091641 A1 Mar. 28, 2019

Related U.S. Application Data

(60) Provisional application No. 62/564,472, filed on Sep. 28, 2017.

(51) Int. Cl.
| | |
|---|---|
| *B01F 15/00* | (2006.01) |
| *B01F 15/06* | (2006.01) |
| *B01F 5/04* | (2006.01) |
| *B29B 7/32* | (2006.01) |
| *F24H 9/00* | (2006.01) |
| *B01F 3/20* | (2006.01) |

(52) U.S. Cl.
CPC .......... *B01F 15/066* (2013.01); *B01F 3/2078* (2013.01); *B01F 5/0403* (2013.01); *B01F 15/00207* (2013.01); *B29B 7/325* (2013.01); *F24H 9/00* (2013.01); *B01F 2215/0039* (2013.01)

(58) Field of Classification Search
CPC .............. B01F 15/066; B01F 15/00207; B01F 2215/0039; B01F 3/2078; B01F 5/04; B01F 5/0453; A47J 43/0716
See application file for complete search history.

(56) References Cited

U.S. PATENT DOCUMENTS

| | | | | |
|---|---|---|---|---|
| 4,985,208 A | * | 1/1991 | Sugawara ............. | B01F 15/066 422/135 |
| 2003/0133856 A1 | * | 7/2003 | Le ......................... | B01F 5/0603 422/206 |
| 2009/0008477 A1 | * | 1/2009 | Merchant ............. | B01F 5/0615 239/305 |
| 2015/0083375 A1 | * | 3/2015 | Heusser ................ | B01F 5/0619 165/109.1 |

* cited by examiner

*Primary Examiner* — Anshu Bhatia

(74) *Attorney, Agent, or Firm* — Young Basile Hanlon & MacFarlane, P.C.

(57) ABSTRACT

A system that provides for simultaneous thermal regulation of both components of a two-component system, while maintaining their separation prior to introduction into a conventional static mixer element, in order to assure that the mixed fluid, when dispensed, is at the optimal temperature and viscosity. The thermal capacity can be adjusted by altering the configuration to increase or decrease the thermal transfer area as required for each specific application.

20 Claims, 10 Drawing Sheets

TEMPERATURE CONDITIONED TWO COMPONENT MIXER MANIFOLD

The application is a non-provisional application that claims priority to U.S. Provisional Application Ser. No. 62/564,472 filed Sep. 28, 2017, the contents of which are incorporated by reference herein.

BACKGROUND

The present invention pertains to methods and devices for fluid handling and more particularly, for providing temperature conditioning and mixing for two component systems.

In fluid dispensing operations, including, but not limited to paints, coatings, adhesives, sealants, and potting and encapsulation compounds, it is common to use fluids consisting of two mixed components (often referred to as "2K" materials) that include a main component material and a catalyst that initiates the curing of the main component material. Curing of the resulting composition begins when the two components are mixed. Because curing begins upon mixture and typically proceeds rapidly to complete cure, it is desirable to keep the main component material and the catalyst separated until just before they are dispensed.

Because the effectiveness and/or speed at which the resulting material cures is dependent on the degree to which the two components are mixed in the resulting composition, The degree to which the two components are admixed will affect cure rate and can affect ultimate composition performance. Because the curing process begins when the two components come in contact with one another, it is desirable to control the point of initial contact and/or the degree and nature of the mixture between the two components. In many applications, it is desirable to keep the components separated from one another for as long as possible prior to the actual dispensing point to assure that a significant portion of the curing process occurs subsequent to dispensing the resulting composition. In addition, careful mixing is also important to assure optimum results.

It has been found that the viscosity of the fluid being dispensed can affect composition application and performance. Thus, the viscosity of the resulting two-part fluid composition, when dispensed, must be carefully controlled to assure optimal performance. Thus, it would be desirable to provide a method and apparatus that can deliver two-component reactive composition to the applicator and ultimately dispense the same in a viscosity-controlled manner.

It would also be desirable to provide a device that could achieve mixing of the components in a two-component reactive composition that can be mounted proximate to the dispensing or application point.

SUMMARY

Disclosed herein is a system that provides for simultaneous thermal regulation of both components of a two-component system, while maintaining their separation prior to introduction into a conventional static mixer element, in order to assure that the mixed fluid, when dispensed, is at the optimal temperature and viscosity. The thermal capacity can be adjusted by altering the configuration to increase or decrease the thermal transfer area as required for each specific application.

As disclosed, the mixer manifold assembly can include a manifold body, a thermal fluid fitting adapter, at least one thermal sensor. The manifold body as disclosed herein has at least one process material conveying conduit and at least one catalyst material conveying conduit defined therein. The manifold body also has at least one thermal conditioning fluid conduit defined therein. Each of the conduits have at least one inlet and at least one outlet. The thermal fitting adapter defined in the mixer manifold assembly as disclosed herein communicates with the at least one thermal fluid conditioning fluid conduit defined in the manifold body and is located at a position distal to the inlets of the of the respective process material conveying conduit and the catalyst material conveying conduit. The at least one thermal sensor is in thermal contact with the process material in the process material conveying conduit. In the manifold mixer assembly as disclosed herein the thermal fluid outlet is coaxially disposed to at least one inlet associated with either the to the process material conveying conduit or the catalyst material conveying conduit.

BRIEF DESCRIPTION OF THE DRAWINGS

In the present disclosure reference is made to the following various drawings in which like reference numerals are used for like elements throughout the various figures. The drawing figures are for illustrative purposes only and include the following.

DETAILED DESCRIPTION

Figure 1:
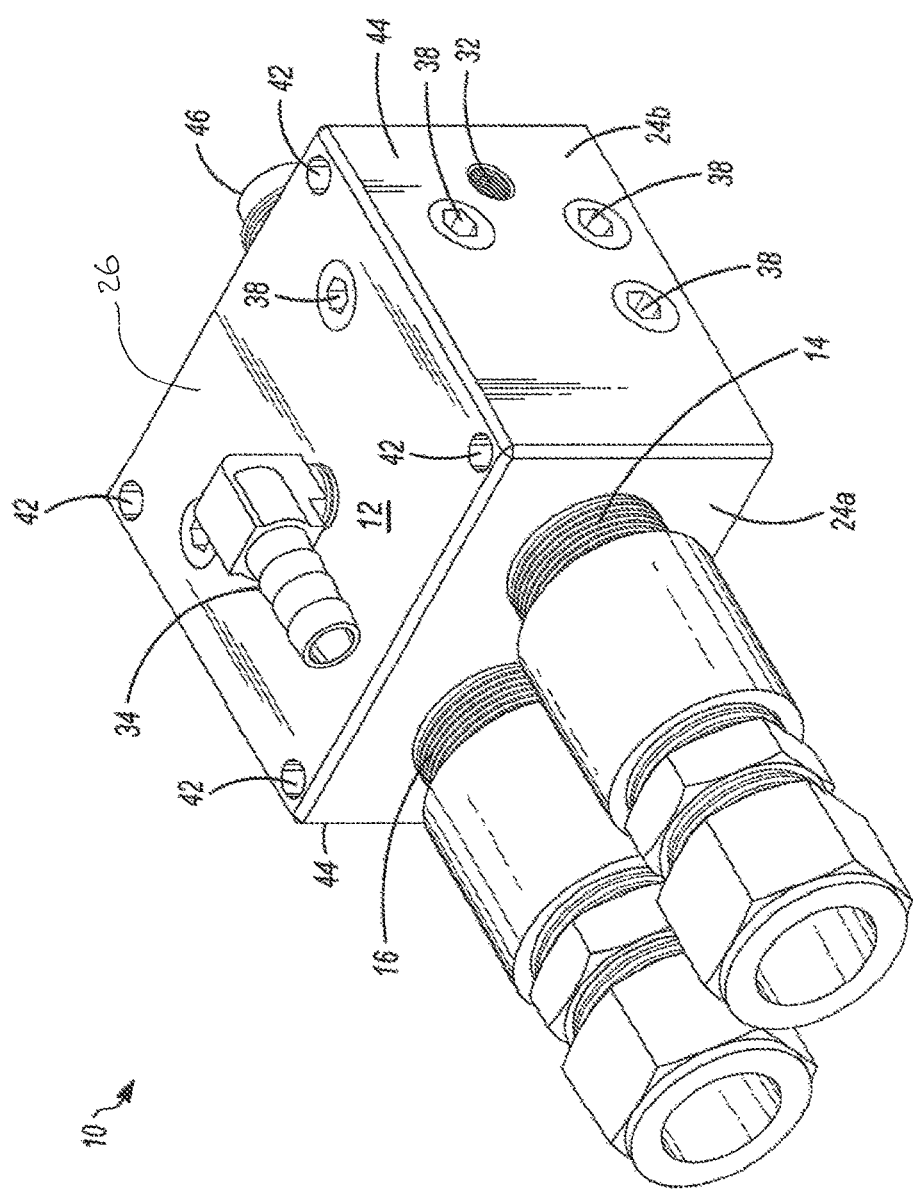
FIG. 1 is an isometric view of an embodiment of the temperature conditioned two-component mixer manifold assembly as disclosed herein.
Figure 2A:
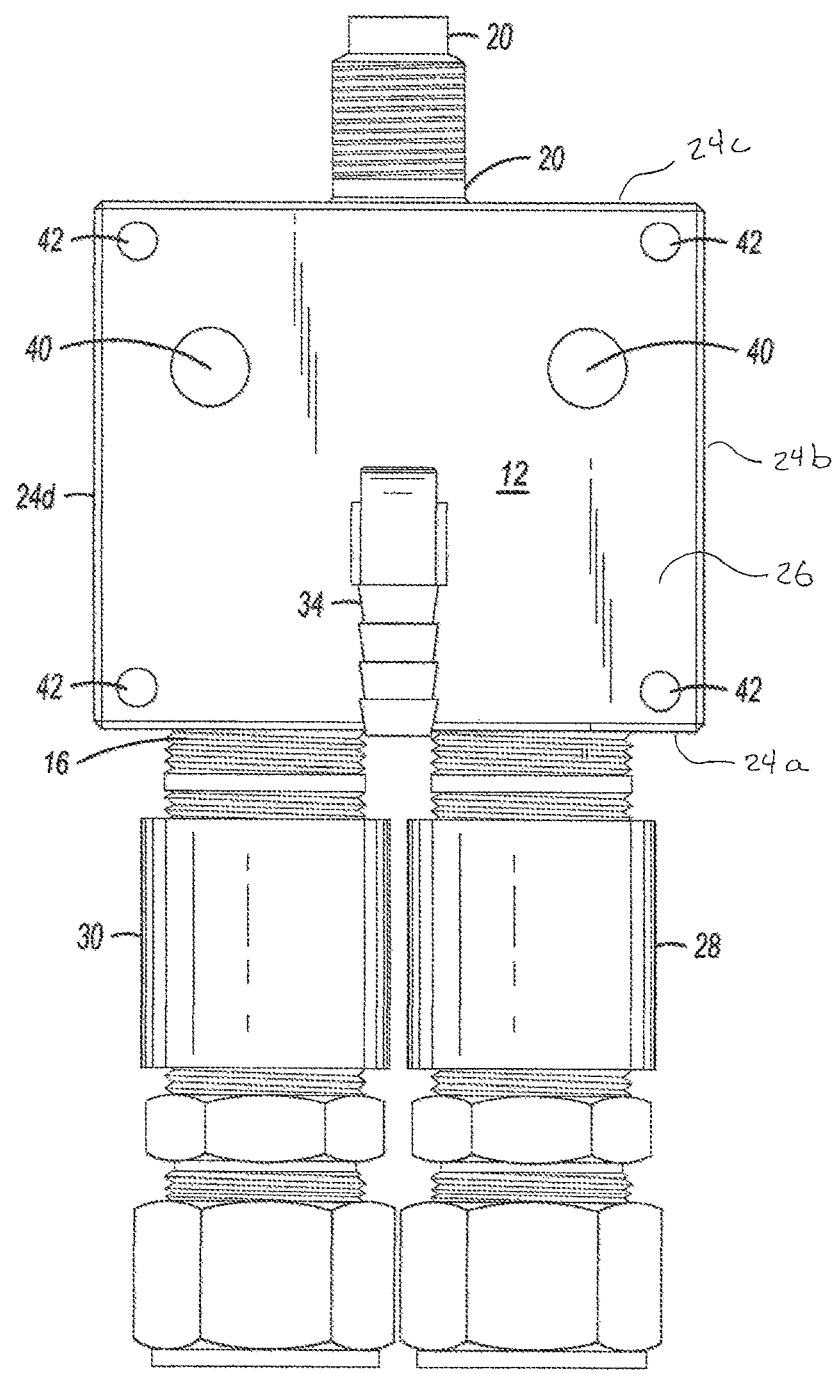
FIG. 2A is a top view of the temperature conditioned two-component mixer manifold assembly of FIG. 1.
Figure 2B:
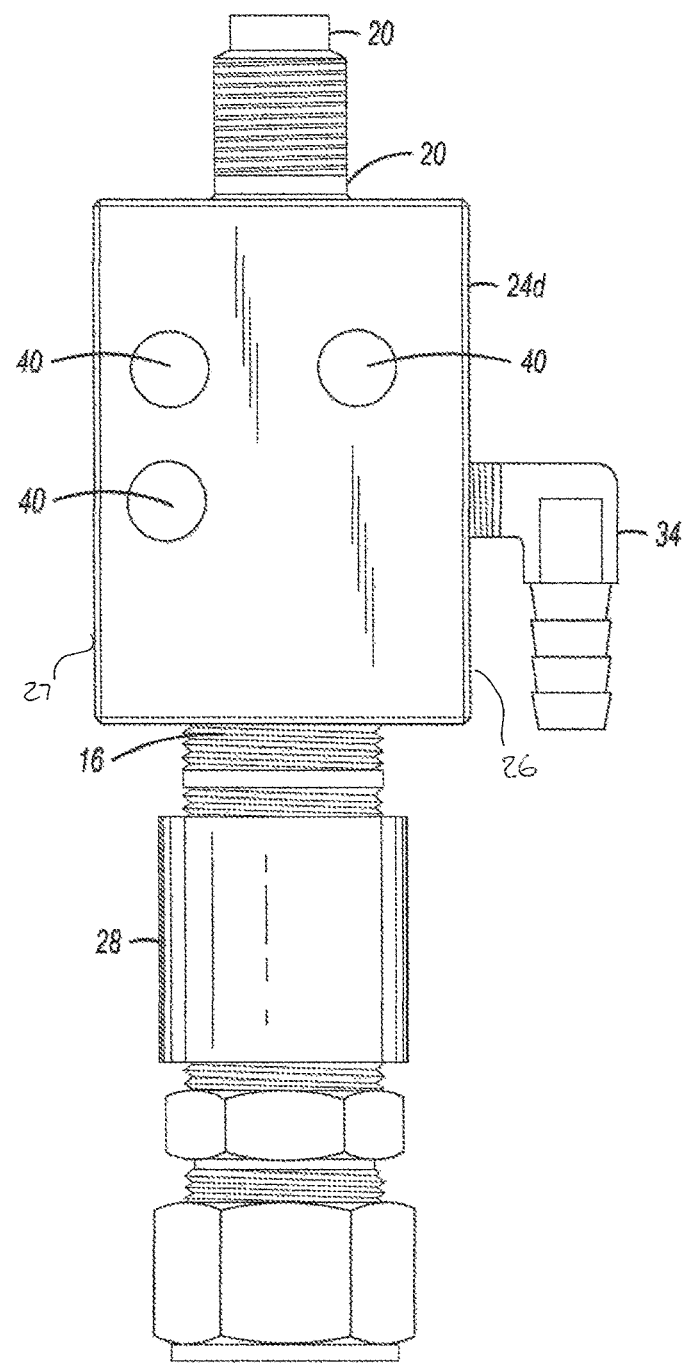
FIG. 2B is a side view of the temperature conditioned two-component mixer manifold assembly of FIG. 1.
Figure 2C:
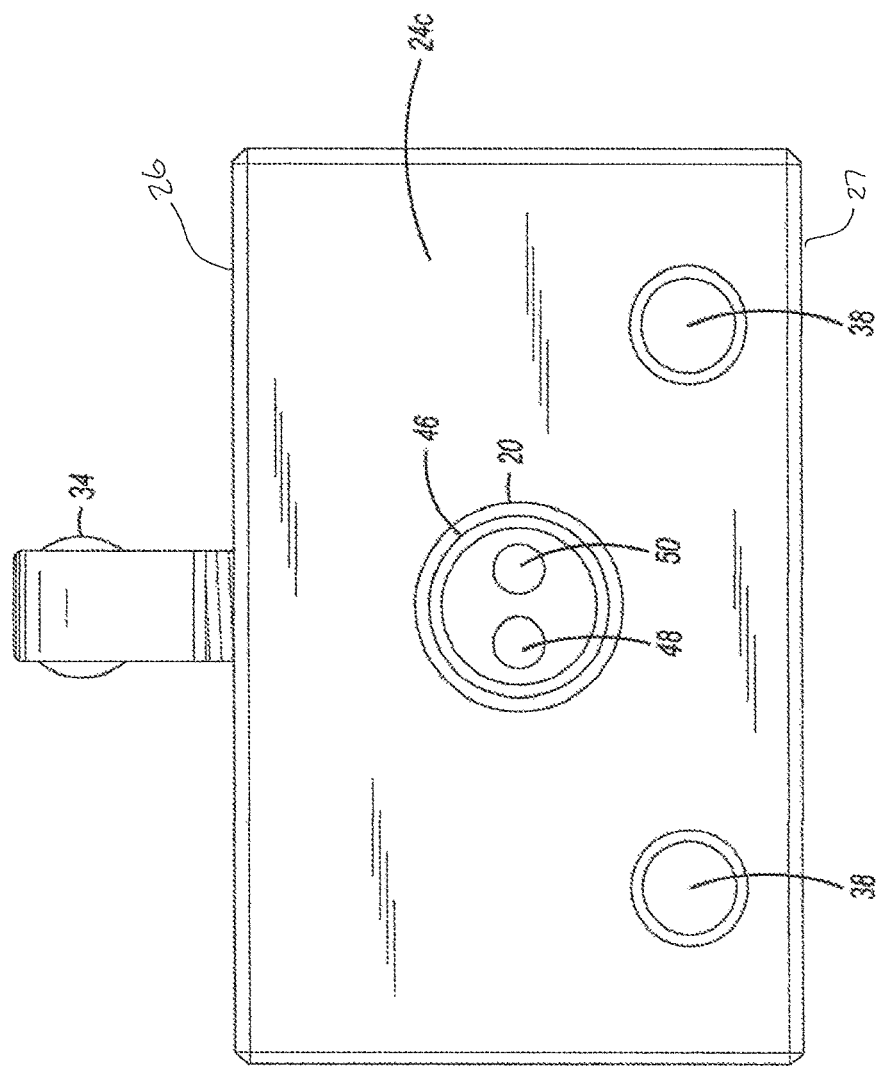
FIG. 2C is a detail view of a mixer attachment end of the temperature conditioned two-component mixer manifold assembly of FIG. 1.

It has been found, quite unexpectedly that control of viscosity of a two-part reactive composition can be performed by exploiting the viscosity vs. temperature characteristics of the mixed fluid by holding the respective components at the optimal dispense temperature, prior to mixing, to assure proper dispensing viscosity after mixing.

In the device and method disclosed herein, by controlling the temperature of the respective components, their individual viscosities can also be predictably controlled, allowing the proper static mixer to be specified in order to assure thorough mixing. In addition to its influence on viscosity, the temperature of the mixed fluid also often influences its rate of cure—with warmer temperatures producing shorter cure times and cooler temperatures extending cure times. In short, maintaining both components of the material at the proper temperature can assure optimal performance upon dispense.

Maintaining accurate temperature of each component, while maintaining total separation to the point of dispense presents significant challenges to dispensing system manufacturers and end-users alike. This is complicated by the fact that many of these two-component fluids are designed with very short cure times, once mixed, to enable them to adhere properly to the target surface(s) and thoroughly cure before they can be disturbed by subsequent steps in the manufacturing process. This short "pot-life" characteristic significantly limits the opportunity to affect control on the material after mixing. Furthermore, attempting to control the material after mixing can result in fouled fluid path components as the material cures on the surface of the material conduit(s) prior to being dispensed. This can shorten the life of the dispensing system, resulting in expense and downtime to repair/rebuild the system.

The apparatus as disclosed herein provides for the simultaneous thermal regulation of both components of a two-component system, while maintaining their separation prior to introduction into the desired static mixer element. In order to assure that the mixed fluid is at the optimal temperature and viscosity when dispensed, thermal capacity can be adjusted altering the configuration to increase or decrease the thermal transfer area as required for each specific application. The apparatus as disclosed herein can achieve adjustment in thermal capacity by altering the configuration to increase or decrease the thermal transfer area as required by parameters associated with each specific application.

The apparatus as disclosed herein can be mounted proximate to the point at which the desired two-component material is to be dispensed. In certain embodiments, this can be at or on the arm of a robot, or on a dispensing pedestal. In other embodiments, the apparatus can be mounted at a location near the point at which the two-component material is dispensed. The apparatus combines temperature conditioning and mixing functions in a single device.

In the device as disclosed herein, thermal transfer function can be adjusted by altering the device configuration to increase or decrease the thermal transfer area as required for each specific material application. The device can assure that the temperature of the material is controlled all the way to the static mixer element, just prior to the application of the mixed material. Without being bound to any theory, it is believed that this dispenser provides for improvements in one or more of viscosity control, and/or mixing control and/or dispensing control. Where desired or required, attachment for the static mixer element can be modified as necessary to accommodate various commercially available static mixer elements to provide compatibility with various dispensing systems. In order to assure temperature/viscosity accuracy, where desired or required, the device can include at least one temperature probe that can be located for direct temperature measurement in one or both of the component streams. In certain embodiments, at least one direct temperature measurement probe is located in the higher volume stream for direct measurement of the higher volume material stream just before entering the static mixer element.

The temperature conditioned two-component mixer manifold assembly as disclosed herein can provide for simultaneous thermal regulation of both components of a two-component system, while maintaining their separation prior to introduction into a suitable static mixer element in order to assure that the mixed fluid, when dispensed, is at the optimal temperature and viscosity.

Figure 4:
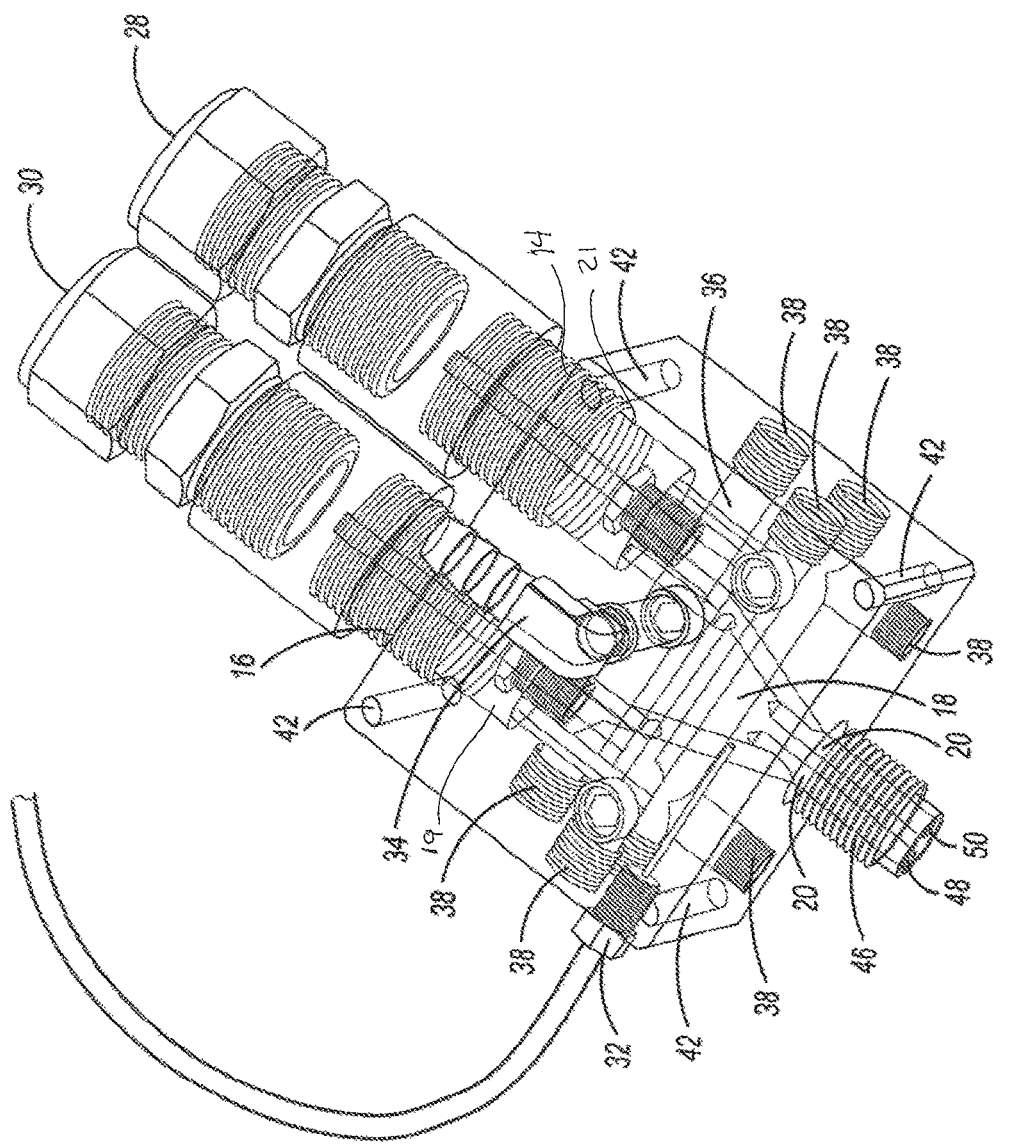
FIG. 4 is a transparent porting view of an embodiment of the temperature sensor in the high-flow material path of the temperature conditioned two-component mixer manifold assembly of FIG. 1.

As illustrated in FIG. 1, the temperature conditioned two-component mixer manifold assembly 10 includes a manifold body 12. The manifold body can be configured as a solid body having a plurality of outwardly oriented surfaces defining side faces, the side faces contiguously connected to an upper face and an opposed lower face. In the embodiment depicted in the drawing figures, the manifold body 12 includes a first inlet port 14 and a second inlet port 16 that communicate with at least one interior channel 18 defined in the interior of the manifold body 12 (as illustrated in FIG. 4). The interior channel 18 terminates in an outlet port 20 that is located in the manifold body 12 at a position distal to the first inlet port 14 and the second inlet port 16.

The manifold body 12 can have a plurality of outwardly oriented faces such as outer side faces 24a, 24b, 24c, 24d contiguously connected to an upper face 26 and an opposed lower face 27. In the embodiment depicted in the various drawing figures, first inlet port 14 and second inlet port 16 are defined on outer side face 24a, the outlet port 20 is located on opposed outer side wall 24c such that the first and second inlet ports 14, 16 are in opposed co-planar relationship with the outlet port 20.

The first and second inlet ports 14,16 can be in fluid communication with respective interior conduits 19, 21 projecting inwardly into the interior of the manifold body 12. The interior conduits 19, 21 can be configured to convey thermal conditioning fluid in a manner that will be described subsequently.

It is contemplated that one or more of the first and second inlet ports 14, 16 can be defined as coplanar with the associated outer face 24a. It is also contemplated that at least one of the first or second inlet ports 14, 16 can be configured to connect to a respective connector conduit such as connector conduits 28, 30. In the embodiment depicted in the drawing figures, the connector conduits 28, 30 project outwardly from the outer face 24a and each define an inner conduit that is in fluid communication with channel 18. Where desired or required, the connector conduits 28, 30 can be configured to be removably detachable from the respective first and second inlet ports 14, 16. In the embodiment depicted in the various drawing figures, the conduits can be configured with suitable mating members such as threading fittings as depicted as desired or required.

Where desired or required, the first inlet port 14 and the second inlet port 16 can be configured such that the interior circumferential area defined each respective inlet port 14, 16 can be the same or different depending on the volume of the respective fluid component to be conveyed through the respective port and the amount of thermal conditioning fluid to be conveyed through the thermal conditioning fluid channel defined therein. In certain two-component systems, one component, usually designated as the main component material will be volumetrically greater that the other, typically catalytic component in order to achieve an appropriate mix ratio. For example, in the embodiment depicted in FIG. 1, inlet port 14 is designated as the main component port configured to receive process fluid or main component material and the inlet port 16 is designated as the inlet port configured to receive catalytic material. Inlet ports 14 and 16 may be of the same size, or they may be fabricated in different sizes to accommodate the specific mix ratio of the material in the application.

The device 10 can include at least one thermal or temperature sensor. The at least one thermal or temperature sensor can communicate with either the process material conveying conduit or the catalyst material conveying conduit. It is also contemplated that the device 10 can be configured with at least two thermal or temperature sensors; with at least one thermal or temperature sensor communicating with the process material stream and at least one thermal or temperature sensor communicating with the catalyst material stream as the respective material flows through the associated inlet port. In the embodiment depicted in the drawing figures, a temperature sensor assembly 32 is positioned in the manifold body 12 in contact with the main component process fluid stream as it passes through the inlet port 14. The thermal or temperature sensor can be in electronic communication with external control and monitoring devices. In the embodiment depicted in the drawing figures, temperature sensor assembly 32 is in electronic contact with external control and monitoring devices (not shown). It is also considered within the purview of this disclosure to include at least one of the temperatures sensors in contact with both respective inlet ports.

The temperature sensor assembly 32 can be configured project into the manifold assembly body 12 through a conduit defined therein. In the embodiment depicted, the temperature sensor assembly 32 can include an elongated probe 33 projecting through the manifold body 12 and into the associated fluid conveying conduit, an anchor base 35 and a suitable connector 37 configured to connect to the manifold body 12 at a location distal to the elongated probe 33 in a manner that minimizes the opportunity for false measurement of any latent temperature held by the manifold body 12. In the embodiment depicted, the elongated probe 33 is dimensioned so as to be isolated from contact with the associated regions of the manifold body 12 when the elongated probe 33 is in the operative or use position.

In the embodiment depicted in the various drawing figures, outlet port region 20 is defined in opposed outer surface 24c and is configured to provide fluid communication with a suitable mixing member such as a static mixer or the like (not shown). The outlet port 20 will have a suitable area to permit movement of the main component process stream and the secondary stream on to a downstream processing unit such as a suitable static mixer unit.

The manifold body 12 also includes at least one thermal fluid conveying conduit that is in fluid communication with at least one thermal fluid inlet fitting 34 that is configured to convey a stream of a thermal conditioning fluid into a water port system 36 defined in the interior of the manifold body 12. The thermal fluid or water port system 36 can include one or more channels that convey thermal conditioning fluid through the interior of the manifold body 12. In the embodiment depicted in the drawing figures, water port system 36 defined in the manifold body 12 can include a plurality of cross-drilled channels 38 that can be closed with suitable devices such as plugs 40 in order to create a flow path for the thermal conditioning fluid though the manifold body 12. Non-limiting examples of suitable thermal conditioning fluid include liquids such as water. The thermal conditioning fluid can be temperature--conditioned in that it can be heated or cooled as determined by the specific thermal conditioning requirements for the desired application. The manifold body 12 can also be configured with one or more mounting elements such as drilled holes 42. The drilled holes 42 can be located at one or more corners 44 of the manifold body 12. In the embodiment in the various drawing figures, the drilled holes 44 are through drilled mounting holes that extend from upper face 26 to opposed lower face 28.

The manifold body 12 also includes a static mixer attachment region 46 that is in fluid communication with the outlet end of process fluid channel 18. In certain embodiments, the static mixer attachment 46 is associated with the outlet port 20 and includes at least two distinct ports such as primary process fluid channel 48 that conveys the primary process fluid therethrough and catalyst fluid channel 50 that conveys catalyst fluid therethrough. The primary process fluid material and catalyst material channels 48, 50 is positioned in the manifold body 12 in a manner that permits the thermal processing fluid to be circulated through the thermal fluid port system 36 on all sides of the transiting process material to provide thermal transfer thereto. In the embodiment as depicted in the various drawing figures, the primary process fluid material and catalyst material porting is through the vertical center of the manifold body 12.

Figure 3:
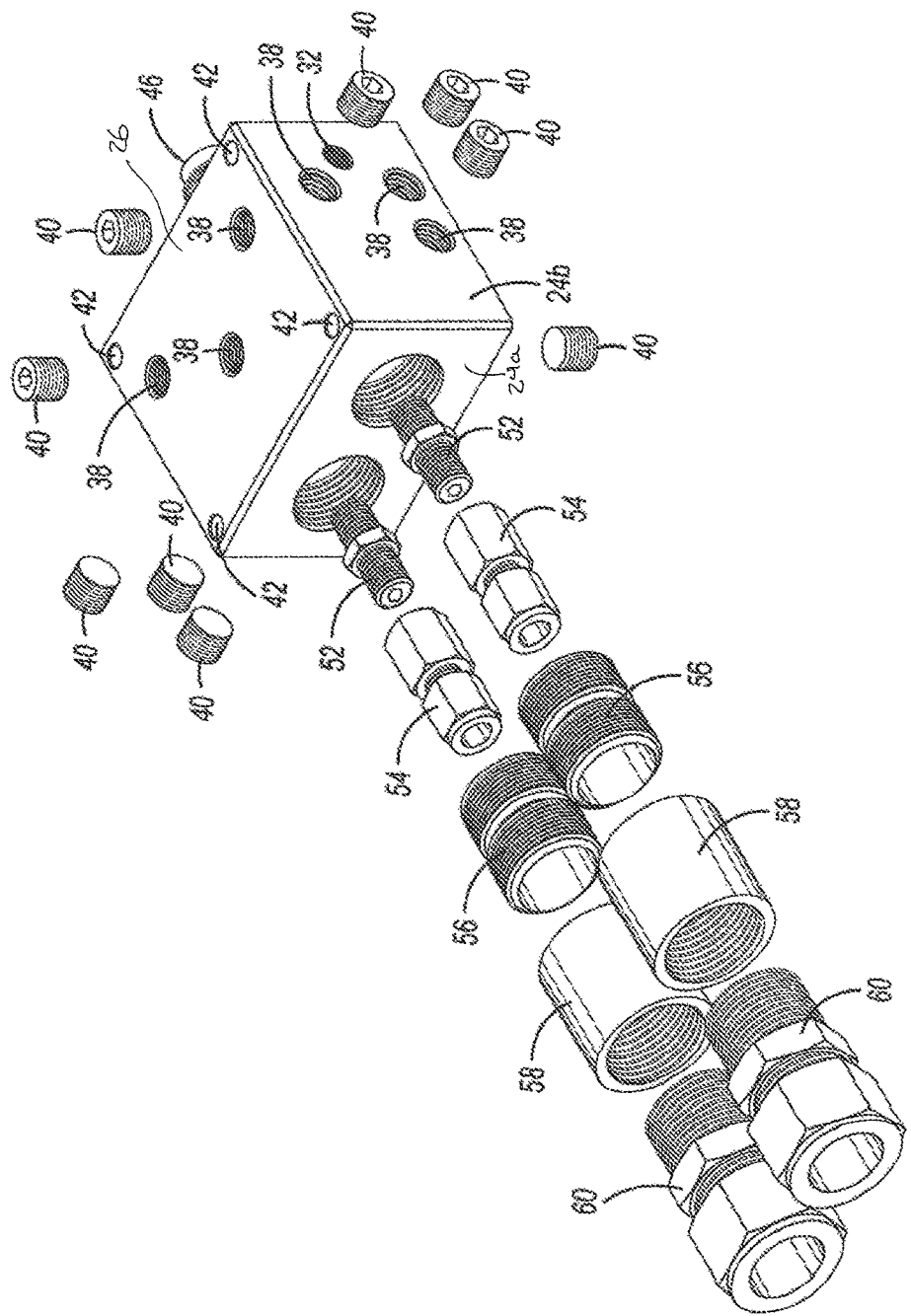
FIG. 3 is an exploded view of the temperature conditioned two-component mixer manifold assembly of FIG. 1.

FIG. 3 shows an exploded isometric view of an embodiment of the manifold assembly 10 as disclosed herein. As previously discussed, the manifold body 12 includes a thermal fluid port system 36 such as a plurality of cross drilled channels 38. The manifold body 12 has at least one cross drilled channel 38 extending from outer side surface 24b for outer side surface 24d and at least one cross drilled channel 38 extends from the upper face 26 to the lower face 28. In the embodiment as depicted in FIG. 3, three cross drilled channels 38 extend from outer side surface 24b for outer side surface 24d and at least three cross-drilled channels 38 extend from the upper face 26 to the lower face 28. The cross-drilled port(s) are suitably sealed as with threaded plugs 40. The cross-porting configuration causes the entire manifold body 12 to become a thermal mass/heat exchanger system which is used to bring the material exiting the manifold body 12 through the static mixer attachment 46 to a suitable set point temperature.

The suitable set point temperature can be defined by suitable external inputs and can be monitored in relation to the process material composition passing through the manifold body 12 by at least one temperature sensor such as temperature sensor 32. The at least one temperature sensor 32 can be positioned in the manifold body 12 in fluid connection with at least one of the transiting process fluid or catalyst fluid stream. In the device 10 as depicted in FIG. 3, at least one temperature sensor 32 is inserted in the process material fluid stream.

The process fluid material stream and the catalyst fluid material stream each enter the manifold body 12 though their respective openings in inlet ports 14, 16. The device 10 can include suitable check valve(s) associated with the manifold body 12 in contact with respective conduits such that one or both of the component streams enter the manifold body 12 through suitable check valves such as check valves 54. The check valves 54 are configured to prevent backflow of material into the respective component streams. This configuration prevents mixed material from flowing backwards into the component streams triggering premature material cure that might compromise the function of the manifold body 12. The check valves 54 can be mounted in the manifold body 12 at one or more suitable locations. In the embodiment illustrated in FIG. 3, check valves 54 are positioned proximate to inlet ports 14 and 16. It is also with in the purview of this disclosure to situate check valves such as check valves 54 at other locations in the manifold body 12 instead of, or in addition to, the locations noted.

The two precursor components can be held in suitable reservoirs and conveyed to the apparatus 10 via suitable tubes such as tubes 52a and 52b. The respective tubes 52a, and 52b conveying the two components are connected via compression fittings 54 to secure the connection against the system pressure. The respective tubes 52a and 52b can be of the same, or different sizes based on the mix ratio of the two components and tubing used in the conveying system.

The water or thermal fluid return circuit is comprised of the thermal fluid inlet fitting 34 feeding tempered water into the manifold body 12. This may be a barb fitting as shown, or it can be a quick-disconnect tubing fitting, crimp-fitting, or any other type fitting as required to mate with the tubing or hose conveying water through the water port system 36. The water port system 36 also includes respective close nipples 56, and couplers 58 that are configured to create respective annular spaces around the process fluid material carrying tube 52a and the catalyst fluid material carrying tube 52b connected to respective compression fittings 54, and to couple to the larger compression fittings 60 that are positioned axially outward around the respective tube 52a and 52b. Compression fittings 60 are configured to couple to a suitable external thermal fluid conveying device. In certain embodiments, the external thermal fluid conveying device can have the coaxial configuration set forth in U.S. patent application Ser. No. 13/982,353, Title: Re-Corable Coaxial Hose System (issued as 9,952,001), the specification of which is incorporated herein. Suitable thermal fluid conveying devices and systems can create a flexible tube-in-tube heat exchanger with the water circulating through the annular space between the inner material carrying tube and the outer thermal conditioning fluid retaining tube. Because the thermal conditioning fluid completely surrounds the respective material carrying tube, the device and thermal fluid contained therein acts to change the temperature of the process material as it is being delivered to the manifold body 12. Because the thermal fluid such as water is split between the two process material hoses, the process fluid material and the catalyst fluid material conveyed in the respective tubes are brought to the same temperature, assuring that when the two components are mixed, the final blend is at the optimal temperature for dispensing. In certain embodiments, it is contemplated that the thermal conditioning fluid is conveyed equally between the two conduits.

Turning to FIG. 4, there is illustrated a transparent porting view depicting temperature sensor 32 in position in the high-flow material path of the manifold assembly 10. This shows the path of the material from inlet ports 14 and 16 and associated connector conduits 28, 30 through the manifold body 12 to the static mixer outlets 48,50. Also shown is water port system 36 that is composed of cross-drilled channels 38 that are arranged to route the thermal conditioning fluid such as water from the thermal fluid inlet connector 34 through the manifold body 12, surrounding the two component material paths to create a heat exchanger system.

As can be seen in FIG. 4, the tip of the temperature sensor 32 is located in the high flow material path. The temperature sensor 32 can be configured to be positioned in channel that is sized to minimize the gap between it and the outside diameter of the probe to eliminate space for material to become trapped.

Figure 5:
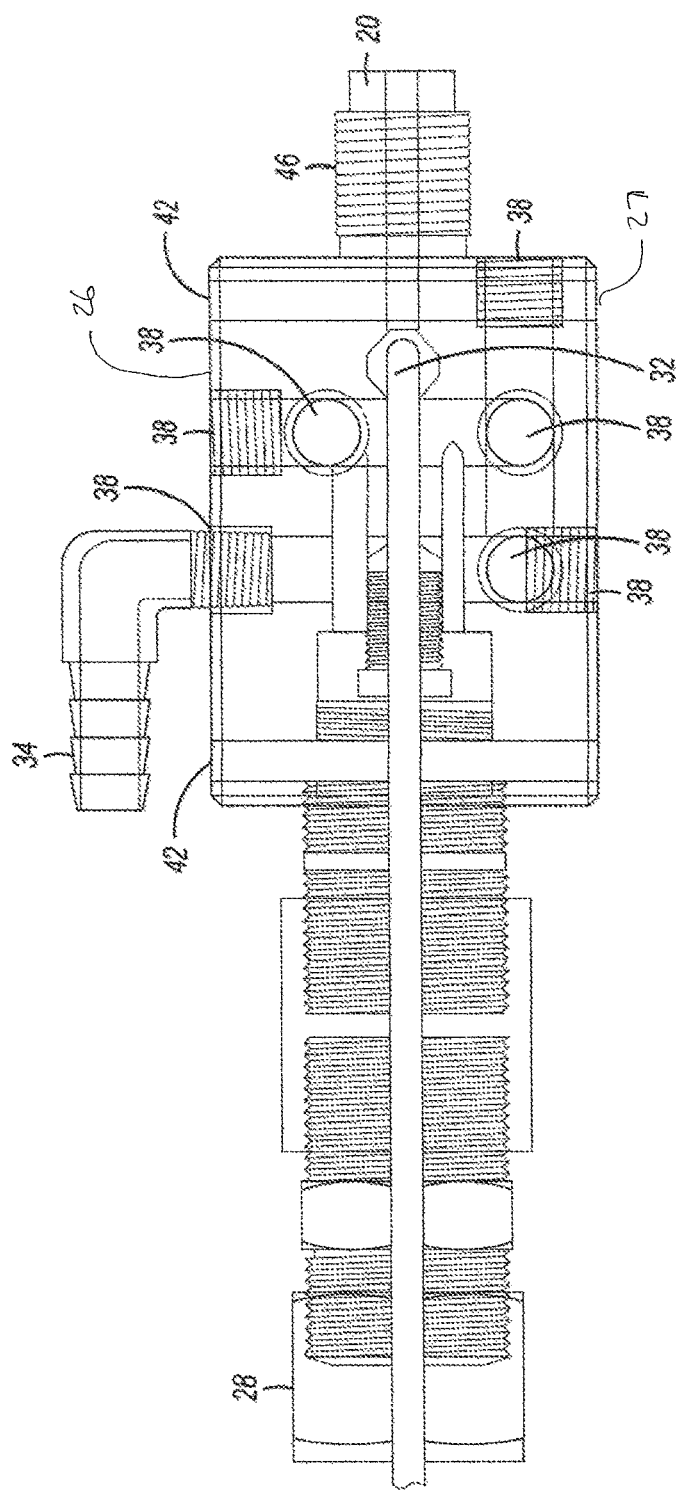
FIG. 5 is a transparent view of an embodiment of the water port configuration in the temperature conditioned two component mixer manifold assembly of FIG. 1.

The surrounding water flow path can be seen in FIG. 5 that illustrates a side view of the manifold body 12 and depicts an embodiment of a thermal port configuration in the manifold assembly 10. The thermal conditioning fluid such as water enters the manifold block 12 through thermal fluid inlet fitting 34 and flows down and through the ports 38 located underneath the material flow paths. Once the thermal fluid has traversed the lower ports 38 the thermal fluid is channeled back toward the static mixer adapter fitting 46, then up and over the material paths, reversing direction to exit the manifold body 12 into the annular space created by the coaxial configuration between the inner material carrying tubes 52a, 52b and outer thermal conditioning fluid carrying hoses.

Figure 6:
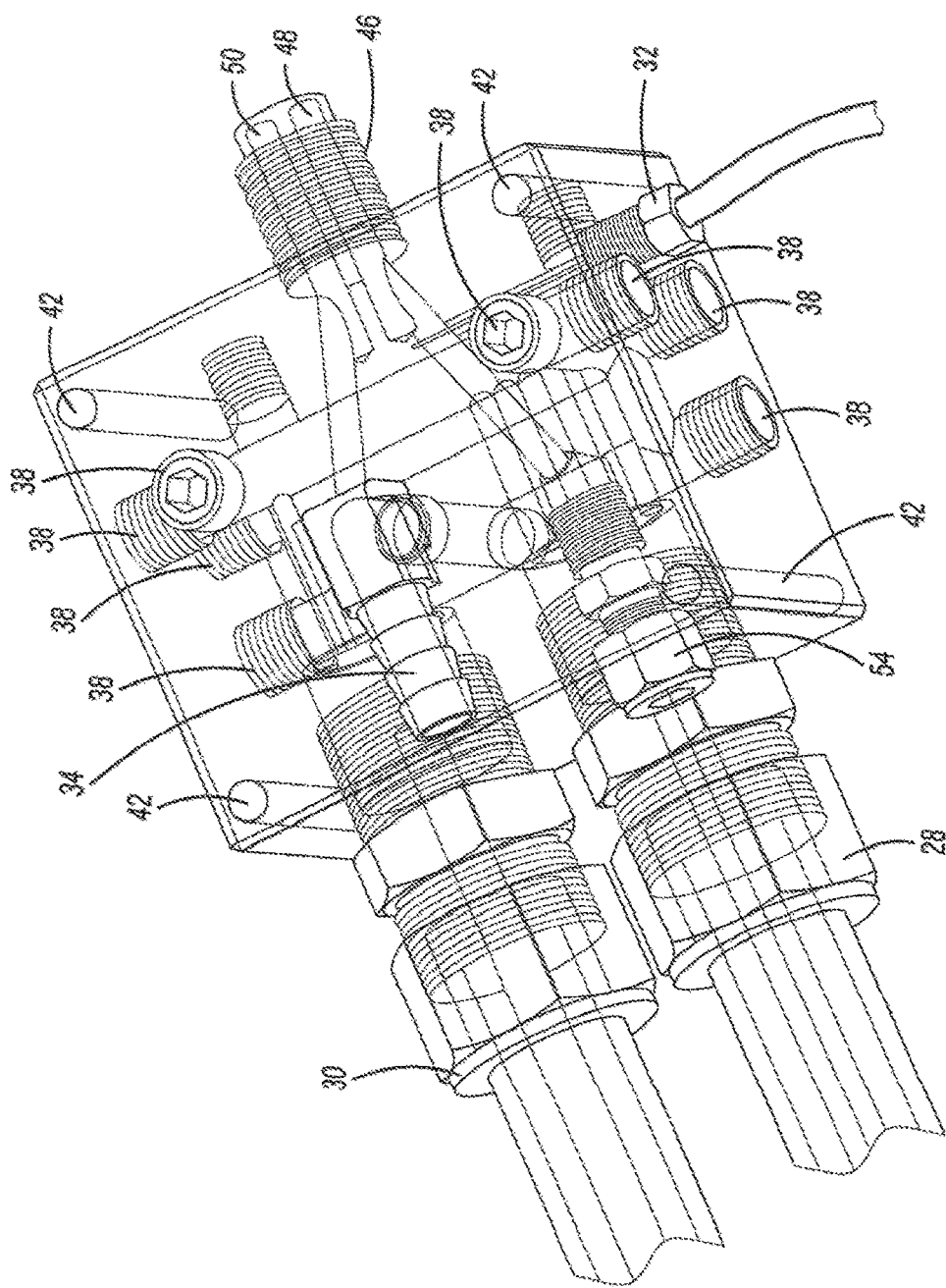
FIG. 6 is a transparent view of the typical connection of the material tube in the high-flow port of the temperature conditioned two-component mixer manifold assembly of FIG. 1.

FIG. 6 shows a transparent view of the typical connection of the material tube 52a, 52b in the respective port in manifold assembly 12. This port is connected to the angular drilled path leading to the corresponding exit port in the static mixer adapter 32. The thermal conditioning fluid exiting the manifold body 12 flows over the water-tight crimp connection and incorporates this stainless thermal mass into the heat exchanging circuit.

Figure 7:
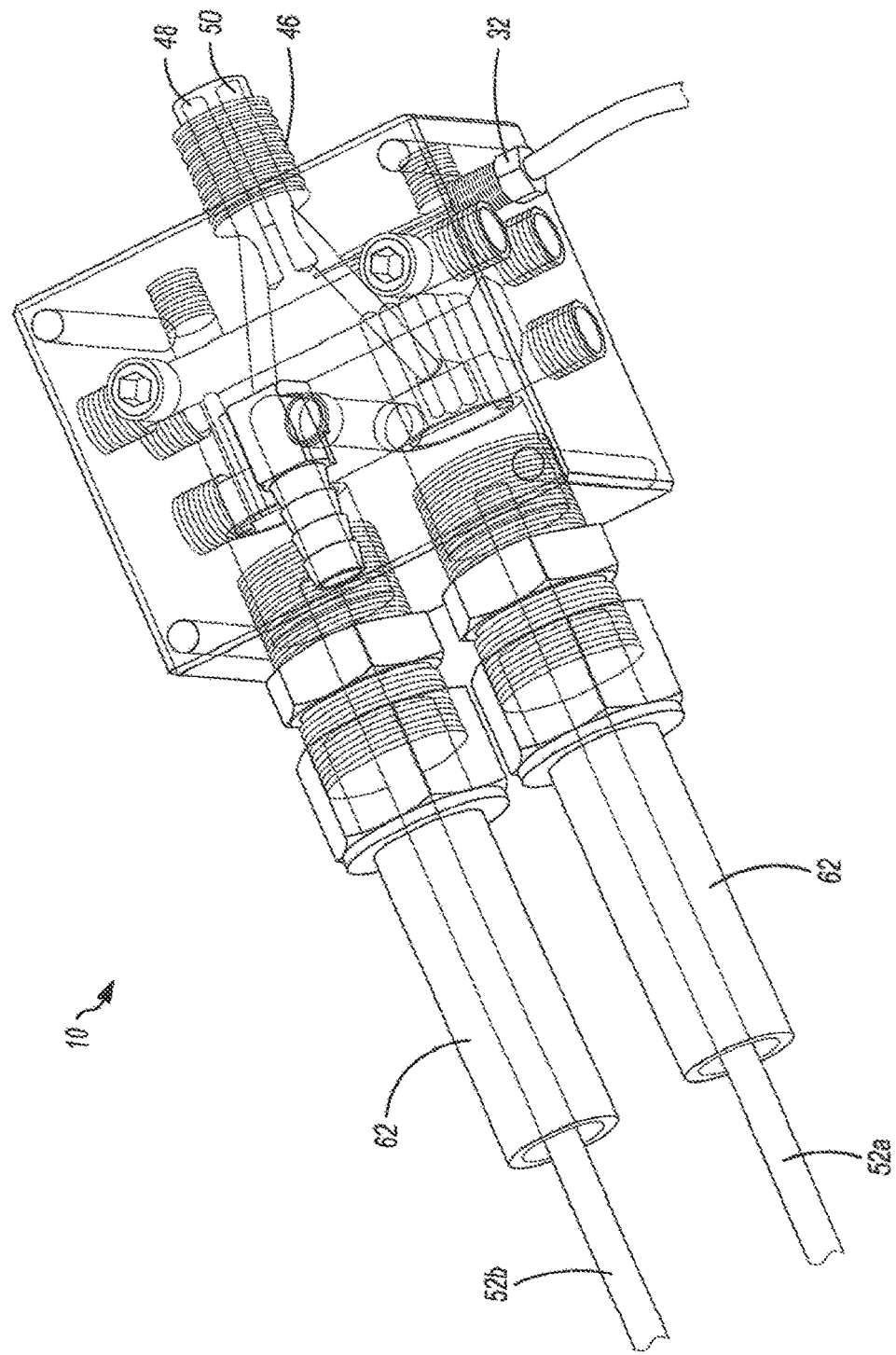
FIG. 7 a transparent view of an embodiment of the connection of the outer hose at the high-flow port of the temperature conditioned two-component mixer manifold assembly of FIG. 1.

In keeping with the configuration set forth in U.S. patent application Ser. No. 13/982,353, entitled Re-Corable Coaxial Hose System (issued as 9,289,793), FIG. 7 shows a transparent view of an embodiment of a connection of the outer hose 62 via the crimp fittings at the inlet ports of the manifold assembly 10. This creates the sealed water path around the outside of the material carrying tubes 52a, 52b in a tube-in-tube heat exchanger configuration. When combined with the thermal mass and heat exchanging configuration of the Manifold block, the two components are maintained at the set point temperature all the way to the outlet ports 48, 50 in the static mixer adapter 46. Where desired or required, the static mixer adapter can be configured by simply changing the diameter, length, and thread specifications to mate with any commercially available static mixer, which allows the flow to be customized for each dispensing application.

The thermal capacity will vary from application to application and can be adjusted by altering the length of the coaxial hoses created in the system. However, in many applications, there will be room in the fixed, non-moving area surrounding the block that can be utilized to improve the thermal transfer characteristics of the circuit. This is accomplished by substituting a portion of the material carrying tube 52a, 52b, often made of nylon, Teflon, or some other polymer, which is a poor thermal conductor with a metal tubing segment composed a conductive material such as stainless steel tubing.

Figure 8:
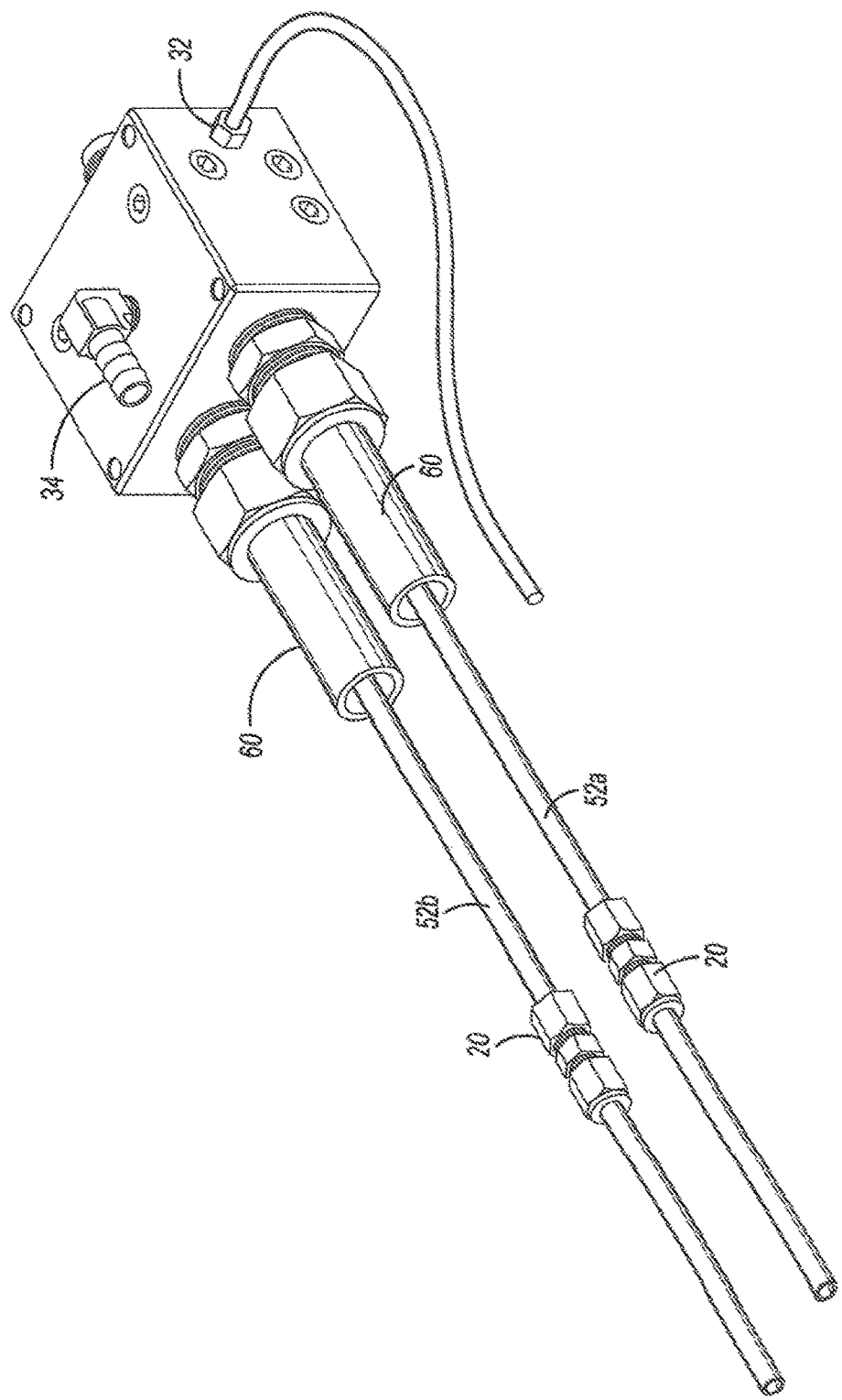
FIG. 8 is an isometric of the temperature conditioned two-component mixer manifold assembly of FIG. 1 with steel leader tubes inserted into the material path.

As depicted in FIG. 8, which shows an isometric view of the manifold assembly device 10 with stainless steel leader tubes inserted into the material path, these stainless-steel segments 66 offer significantly better thermal transfer than does the polymeric tubing normally used to convey these components throughout the system. This increase in efficiency at the dispensing end of the system means in that there may be less coaxial hose system required to assure that the dispense temperature is held at the desired set point, which can improve system efficiency. The stainless tubing is selected to match the outside diameter of the polymeric fluid conveying tubes, but the inside diameter may be larger, as a thinner wall will be required to contain the system pressure. This also increases the thermal transfer of the system. The stainless steel tubing is coupled to the polymeric tubing with a compression union, but the outside hose is continued all the way to the block, thus creating a contiguous water path.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A mixer manifold assembly comprising:
   a manifold body having at least one process material conveying conduit and at least one catalyst material conveying conduit defined therein, and having at least one thermal conditioning fluid conduit defined therein, the conduits each having at least one inlet and at least one outlet;
   at least one thermal fluid fitting adapter communicating with the at least one thermal fluid conditioning fluid conduit defined in the manifold body, the thermal fluid fitting adapter positioned at a location distal to the inlets of the respective process material conveying conduit and the catalyst material conveying conduit; and
   at least one thermal sensor in thermal contact with the process material in the process material conveying conduit;
   wherein the thermal fluid outlet is coaxially disposed to at least one inlet associated with either the to the process material conveying conduit or the catalyst material conveying conduit.

2. The mixer manifold assembly of claim 1 wherein the at least one thermal fluid fitting adapter is positioned at a location between the inlets of the respective process material conveying conduit and the catalyst material conveying conduit and the at least one outlet.

3. The mixer manifold assembly of claim 1 wherein the thermal fitting adapter communicates with a thermal fluid port system, the at least one thermal conditioning fluid conduit being a part of the thermal fluid port system.

4. The mixer manifold assembly of claim 3 wherein the thermal fluid port system comprises a plurality of cross-drilled channels, wherein at least one of the cross-drilled channels communicates with at least one additional cross-drilled channel to define a flow path, the cross-drilled channels including removable plugs, the removable plugs configured to alternately define at least one first flow path and at least one second flow path.

5. The mixer manifold assembly of claim 4 wherein the manifold body is a solid member having a plurality of outwardly oriented surfaces defining side faces, the side faces contiguously connected to an upper face and an opposed lower face, wherein the at least one process material conveying conduit and at least one catalyst material conveying are in fluid communication with respective inlet ports, the respective inlet ports located a first side face and projecting inwardly therefrom.

6. The mixer manifold assembly of claim 5 wherein the manifold body further comprises an outlet port defined on a second side face of the manifold body, wherein the outlet port is distal to the respective inlet ports, wherein the inlet ports and outlet port are in co-planar relationship.

7. The mixer manifold assembly of claim 6 wherein the at least one thermal fluid conditioning conduit is in fluid communication with a channel defined in the at least one process material conveying conduit and the at least one catalyst material conveying conduit.

8. The mixer manifold assembly of claim 1 wherein the thermal sensor is a temperature sensor assembly comprises an elongated probe, an anchor connected to the elongated probe and a connector member, wherein the connector member releasably engages the manifold body.

9. The mixer manifold assembly of claim 1 wherein the thermal conditioning fluid conduit comprises a plurality of closable cross drilled channels and a plurality of plugs configured to be releasably connected to the channels.

10. The mixer manifold of claim 1 further comprising at least one mounting element, the at least one mounting element configured as a drilled hole located proximate to a corner region of the manifold body.

11. The mixer manifold assembly of claim 10 wherein the at least one drilled hole extends from a first manifold face to a second manifold face opposed thereto.

12. The mixer manifold assembly of claim 1 further comprising a thermal return circuit, the thermal fluid return circuit comprising a thermal fluid inlet fitting projecting form the manifold body.

13. The mixer manifold of claim 1 wherein the thermal sensor is a temperature sensor assembly comprising an elongated probe, an anchor base connected to the anchor probe and a connector member, wherein the connector member releasably engages the manifold body and wherein the thermal conditioning fluid conduit comprises a plurality of closable cross-drilled channels and a plurality of plugs configured to be releasably connected to the channels.

14. The mixer manifold of claim 13 further comprising at least one mounting element, the at least one mounting element configured as a drilled hole located proximate to a corner region of the manifold body.

15. The mixer manifold of claim 14 further comprising a thermal return circuit, the thermal fluid return circuit comprising a thermal fluid inlet fitting projecting form the manifold body.

16. A mixer manifold assembly comprising:
   a manifold body having at least one process material conveying conduit and at least one catalyst material conveying conduit defined therein, and having at least one thermal conditioning fluid conduit defined therein, the conduits each having at least one inlet and at least one outlet;
   at least one thermal fluid fitting adapter communicating with the at least one thermal fluid conditioning fluid conduit defined in the manifold body, the thermal fluid fitting adapter positioned at a location distal to the inlets of the respective process material conveying conduit and the catalyst material conveying conduit, the thermal fluid adapter positioned at a location between the inlets of the respective process material conveying conduit and the catalyst material conveying conduit and the at least one outlet; and
   at least one thermal sensor in thermal contact with the process material in the process material conveying conduit, wherein the thermal sensor is a temperature sensor assembly comprises an elongated probe, an anchor base connected to the anchor probe and a connector member, wherein the connector member releasably engages the manifold body; and
   a thermal return circuit, the thermal fluid return circuit comprising a thermal fluid inlet fitting projecting form the manifold body,
   wherein the thermal fluid outlet is coaxially disposed to at least one inlet associated with either the process material conveying conduit or the catalyst material conveying conduit.

17. The mixer manifold assembly of claim 16 wherein the thermal fitting adapter communicates with a thermal fluid port system, the at least one thermal conditioning fluid conduit being a part of the thermal fluid port system.

18. The mixer manifold assembly of claim 17 wherein the thermal fluid port system comprises a plurality of cross-drilled channels, wherein at least one of the cross drilled communicates with at least one additional cross drilled channel to define a flow path, the cross drilled channels including removable plugs, the removable plugs configured alternately define at least one first flow path and at least one second flow path.

19. The mixer manifold assembly of claim 18 wherein the manifold body is a solid member having a plurality of outwardly oriented surfaces defining side faces, the side faces contiguously connected to and upper face and an opposed lower face, wherein the at least one process material conveying conduit and at least one catalyst material conveying are in fluid communication with respective inlet ports, the respective inlet ports located a first side face and projecting inwardly therefrom.

20. The mixer manifold assembly of claim 19 wherein the manifold body further comprises an outlet port defined on a second side face of the manifold body, wherein the outlet port is distal to the respective inlet ports, wherein the inlet ports and outlet port are in co-planar relationship.

* * * * *